(12) United States Patent
Tanimoto

(10) Patent No.: US 7,808,667 B2
(45) Date of Patent: Oct. 5, 2010

(54) COMMUNICATION DEVICE AND COMMUNICATION METHOD

(75) Inventor: Yoshifumi Tanimoto, Hirakata (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 1170 days.

(21) Appl. No.: 11/429,013

(22) Filed: May 4, 2006

(65) Prior Publication Data
US 2006/0274365 A1    Dec. 7, 2006

(30) Foreign Application Priority Data
Jun. 6, 2005    (JP)  ............... 2005-166207

(51) Int. Cl.
*G06F 3/12* (2006.01)
*G06K 15/00* (2006.01)
(52) U.S. Cl. .............. 358/1.15; 358/1.13; 358/1.16
(58) Field of Classification Search ........... 358/1.15, 358/1.14, 1.13, 400, 401, 1.1, 1.16, 1.17, 358/404, 444, 1.18, 402, 403, 407, 435, 436, 358/438, 439, 468; 710/1, 15, 20, 62, 64, 710/72; 347/2, 3, 5, 14, 23; 399/1, 8, 9
See application file for complete search history.

(56) References Cited

U.S. PATENT DOCUMENTS

| 7,650,095 | B2* | 1/2010 | Fuqua et al. ............ 399/80 |
| 2005/0105140 | A1* | 5/2005 | Ozaki .................. 358/402 |
| 2006/0087690 | A1* | 4/2006 | Park et al. ............ 358/1.15 |

FOREIGN PATENT DOCUMENTS

| JP | 11088644 | A | 3/1999 |
| JP | 2002094692 | A | 3/2002 |
| JP | 2002-258684 | | 9/2002 |
| JP | 2003-060873 | | 2/2003 |
| JP | 2004-023604 | | 1/2004 |
| JP | 2004223989 | A | 8/2004 |
| JP | 2004248303 | A | 9/2004 |
| JP | 2004260487 | A | 9/2004 |

OTHER PUBLICATIONS

Japanese language office action and its English language translation for corresponding Japanese application 2005-166207 lists the references above.

* cited by examiner

*Primary Examiner*—Dov Popovici
(74) *Attorney, Agent, or Firm*—Hogan Lovells US LLP

(57) ABSTRACT

A communication device, which receives data from outside, reads identification information from a storage medium in a noncontact manner, and determines whether or not the identification information has been read. When a determination is made that the identification information has been read, the communication device retrieves a processing mode stored by being associated with the identification information. The communication device executes a processing of the received data by the retrieved processing mode.

13 Claims, 5 Drawing Sheets

FIG. 3

| TRANSMITTER | TAG ID | PRESENCE | ABSENCE |
|---|---|---|---|
| TSI=12345 | 0001 | PC=192.168.1.1 | PRINT OUT |
| TSI=7890 | 0002 | PC=192.168.1.2 | PRINT OUT |
| FROM=abc@fax.net | 0003 | MAIL=0003@pc.com | TAG=0002 |
| OTHERS | 0004 | PRINT OUT | TEL=090-1234-5678 |

FIG. 4

| TAG ID | PRESENCE/ABSENCE |
|--------|------------------|
| 0001   | ○                |
| 0002   | ○                |
| 0003   | ○                |
| 0004   | ×                |

COMMUNICATION DEVICE AND COMMUNICATION METHOD

BACKGROUND OF THE INVENTION

1. Field of the Invention

The present invention relates to a communication device and a communication method for receiving data from outside.

2. Description of the Related Art

A Multi Function Peripheral (MFP), which includes a facsimile function and an Internet facsimile function or the like, decodes received image data for facsimile communication and forwards the decoded image data to a Personal Computer (PC).

In a proposed facsimile machine, a presence or an absence of a user is previously set. When the user is present, the proposed facsimile machine decodes the received image data for facsimile communication and prints out the decoded image data. Meanwhile, when the user is absent, the facsimile machine stores the image data in an internal storage unit without printing out the image data.

A consideration is made of configuring the MFP as the above-described facsimile machine in which when a user is present in a room, the received image data for facsimile communication is forwarded to a PC, and when the user is absent, the received image data is stored in the MFP without being forwarded to the PC.

However, since the user is required to previously set in the facsimile machine whether or not the user is present in the room, the above-described facsimile machine is inconvenient. When the user forgets to switch the setting of presence/absence, the facsimile machine stores the decoded image data into the internal storage unit even during the presence of the user, and the facsimile machine prints out the decoded image data during the absence of the user.

A conventional image forming device uses a Radio Frequency IDentification (RFID) (a noncontact automatic identification technology using wireless communication) to retrieve identification information stored in an Integrated Circuit (IC) tag, and determines whether or not to carry out an image forming process in accordance with the retrieved identification information. In this case, an IC tag storing different identification information is assigned to each user. The image forming device distinguishes a user permitted to carry out the image forming process and a user not permitted to carry out the image forming process in accordance with the identification information stored in the IC tag. The image forming device does not carry out the image forming process for the user not permitted to carry out the image forming process.

SUMMARY OF THE INVENTION

The present invention has been made focusing on a method for distinguishing users by using such an IC tag. When a reader (RFID reader) reads identification information stored in a storage medium such as the IC tag, received data may be processed (for example, forwarded to a PC) under a mode stored by being associated with the read identification information. An advantage of the present invention is to provide a communication device and a communication method which can distinguish between a present user and an absent user without previously setting a presence or an absence of the user and which can appropriate process the data to be delivered to the present user.

According to another advantage of the present invention, when the reader did not read the identification information, the received image data may be processed (for example, printed out) under a mode stored by being associated with the identification information not read. As described above, an advantage of the present invention is to provide a communication device and a communication method which can appropriately process the data to be delivered to the absent user.

According to another advantage of the present invention, a determination can be carried out as to whether or not the reader has read the identification information stored by being associated with a transmitter of the received data. As described above, an advantage of the present invention is to provide a communication device and a communication method which can process the received data under an appropriate mode according to a presence or an absence of a user who should receive the data from the transmitter.

Another advantage of the present invention is to provide a communication device and a communication method which can process data to be delivered to a present user or an absent user under an appropriate mode by forwarding received data to outside, printing out the received data or notifying a reception of the data.

According to a first preferred aspect of the present invention, in a communication device which receives data from outside, identification information to be stored in a storage medium, which stores identification information, and a data processing mode are associated and stored. A reader reads the identification information stored in the storage medium in a noncontact manner. The reader determines whether or not the stored identification information has been read. When a determination is made that the identification information has been read, the received data is processed under a mode stored by being associated with the read identification information.

According to a second preferred aspect of the present invention, a plurality of different processing modes are stored by being associated with the identification information stored in the storage medium. When a determination is made that the stored identification information has not been read, the received data is processed under a mode, which is stored by being associated with the identification information and different from the above mode.

According to a third preferred aspect of the present invention, the identification information stored in the storage medium and a transmitter of receiving data are associated and stored. A determination is carried out as to whether or not the identification information stored by being associated with the transmitter of the received data has been read.

According to a fourth preferred aspect of the present invention, the stored processing mode includes forwarding of the received data to the outside, printing out of the received data or notifying the reception of the data.

According to the first preferred aspect, the processing mode is stored by being associated with the identification information stored in the storage medium such as an IC tag, and the received data is processed. Therefore, the storage medium storing the identification information is assigned to a user. When the reader reads the identification information, the user assigned with the storage medium is present in an identification information reading area of the reader (for example, in a room where the communication device is located). Therefore, the communication device processes the received data (for example, forwards the received data to a PC of the user) under the processing mode associated with the identification information read by the reader. When the received data has been forwarded from the communication device to the PC, the user receives the data received by the communication device with its PC.

When a plurality of users share the communication device, each user is generally assigned with a storage medium storing different data. In this case, the data received by the communication device is processed under a different mode for each user.

According to the second preferred aspect, a plurality of different processing modes are stored by being associated with the identification information stored in the storage medium. When the reader did not read the identification information, the user assigned with the storage medium is not located with the identification information reading area of the reader. Therefore, the communication device processes the received data (for example, print out the received data, or store the received data in a storage unit of the communication device) under the mode different from when the identification information has been read (i.e. when the user is present).

When the received data is printed out, for example, another person present in the room where the communication device is located keeps the printed-out data. When a user who should receive the data returns to the room, the person keeping the printed-out data hands the printed-out data to the user. Therefore, the user receives the data, which has been received by the communication device, under a printed-out state. Meanwhile, in case the received data is stored in the storage unit of the communication device, when the user who should receive the data returns to the room, the user operates the communication device to forward the data to its PC or to print out the data.

According to the third preferred aspect, the transmitter of the receiving data is stored by being associated with the identification information stored in the storage medium. The identification information is stored by being associated with the processing mode. The storage medium assigned to each of the user, who should receive the data transmitted from one transmitter, and the user, who should receive the data transmitted from a different transmitter, respectively stores different identification information. When the communication device receives the data, in case the reader reads the identification information associated with the transmitter of the received data, the user assigned with the storage medium storing the read identification information is present. In case the reader did not read the identification information associated with the transmitter of the received data, the user assigned with the storage medium storing the identification information that has not been read is absent. Therefore, the received data is processed under the mode in which the user is present or the mode in which the user is absent.

According to a fourth preferred aspect, the communication device processes the received data under either one of the following (a), (b) and (c) or a combination of at least two of (a), (b) and (c): (a) forward the received data to the outside (for example, a PC or a printer, etc. connected via a Local Area Network (LAN)), (b) print out the received data by an internal printer of the communication device, and (c) notify the reception of the data to the user by transmitting electronic mail to the PC or a mobile telephone, carrying out voice communication with a telephone set, or displaying on a display unit of the communication device.

According to the first preferred aspect, by assigning the storage medium storing the identification information to the user, a determination can be made that when the reader reads the identification information, the user is present in the identification information reading area of the reader and that when the reader did not read the identification information, the user is absent. When the user is present, the communication device can process the received data under a prescribed mode. Therefore, without previously setting the presence or the absence of the user with the communication device, the data to be delivered to the present user can be processed appropriately, and convenience of the user can be improved. Furthermore, it is possible to prevent the communication device from processing the received data under an inappropriate mode resulting from the user forgetting to switch the setting of the presence/absence.

When a plurality of users share the communication device, for example, the received data can be processed under an optimum mode for each user.

According to the second preferred aspect, when the reader did not read the identification information, in other words, when the user is not present in the identification information reading area of the reader, the received data can be processed under a prescribed mode different from when the user is present. Therefore, without previously setting the presence/absence of the user with the communication device, the data to be delivered to the absent user can be processed appropriately, and convenience of the user can be improved.

According to the third preferred aspect, without previously setting the presence/absence of the user associated with the transmitter of the data with the communication device, the data to be delivered to the user can be processed appropriately and the convenience of the user can be improved. Even when sharing the communication device among a plurality of users, regardless of the presence or the absence of the user not associated with the transmitter of the received data, the communication device can process the received data under an optimum mode according to the presence or the absence of the user associated with the transmitter of the received data.

According to the fourth preferred aspect, according to the presence or the absence and the convenience or the like of the user, the communication device can process the received data under either one of the following previously stored modes: (a) forward the received data to the outside, (b) print out the received data, and (c) notify the reception of the data.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3 illustrates an example of data stored in a processing mode storage unit of the MFP according to a preferred embodiment of the present invention.

FIG. 4 illustrates an example of data stored in a presence/absence storage unit of the MFP according to a preferred embodiment of the present invention.

DETAILED DESCRIPTION OF PREFERRED EMBODIMENTS

Figure 1:
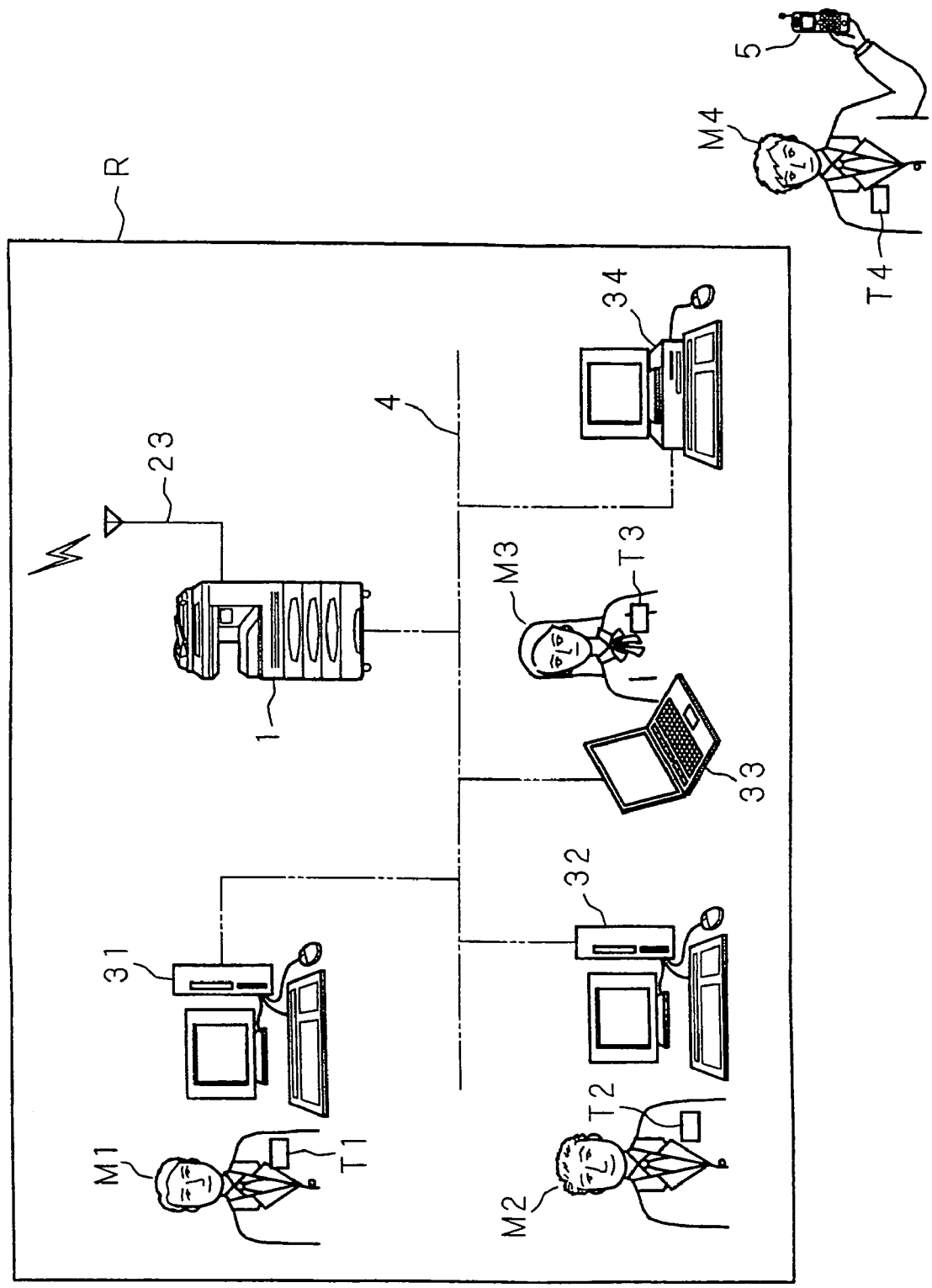
FIG. 1 illustrates a private branch communication system including an MFP as a communication device according to a preferred embodiment of the present invention.
Figure 2:
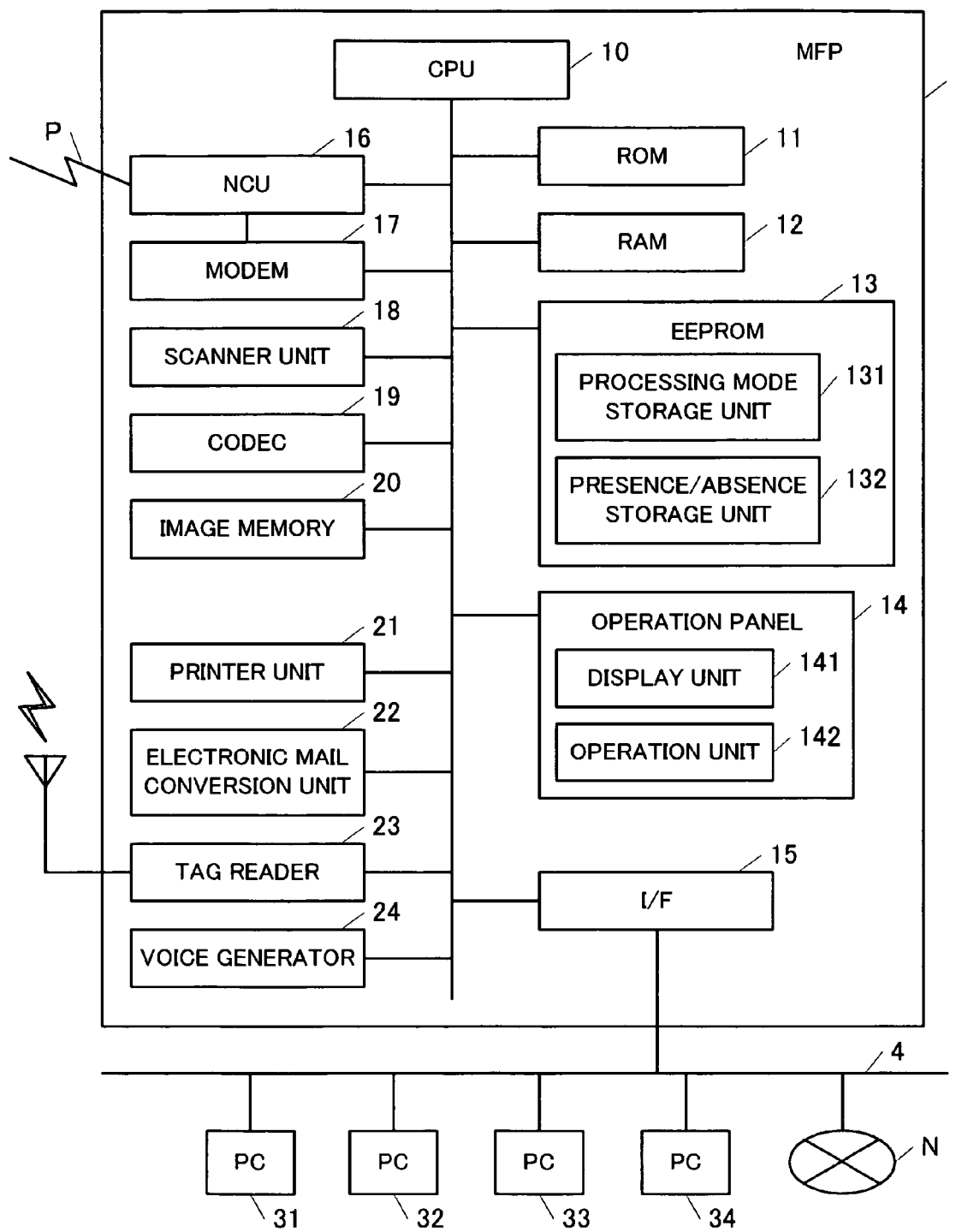
FIG. 2 is a block diagram illustrating a configuration of the MFP according to a preferred embodiment of the present invention.

FIG. 1 illustrates a private branch communication system including an MFP 1 as a communication device according to a preferred embodiment of the present invention. FIG. 2 is a block diagram illustrating a configuration of the MFP 1. The MFP 1 is a digital MFP including a scanner function, a copy function, a printer function, a facsimile (FAX) function, and an Internet facsimile (I-FAX) function or the like. The following description is primarily of the FAX function and the I-FAX function or the like of the MFP 1.

For example, the MFP 1 and PCs 31 and 32 or the like are installed in a room R of a first company. Card-typed IC tags T1 and T2 or the like used as name tags are respectively assigned to employees M1 and M2 or the like of the first company. The IC tags T1 and T2 or the like respectively store various pieces of different identification information in respective internal ICs (not illustrated) (hereinafter referred to as a "tag ID"). The IC tags T1 and T2 or the like are respectively a passive IC tag. The IC tags T1 and T2 or the like respectively drive the IC by electromotive force of radio waves emitted by a tag reader 23, and return the tag ID stored in the IC by using (reflecting) the received radio waves. Further, the IC tags T1 and T2 or the like are not limited to a passive IC tag. For example, the IC tags T1 and T2 or the like may be a semipassive IC tag that includes a battery to drive the IC and reflects the received radio waves. Alternatively, the IC tags T1 and T2 or the like may be an active IC tag that includes a battery and emits the radio waves.

In the room R, the employees M1 and M2 or the like respectively use assigned PCs 31 and 32 or the like. An employee M4, who goes out from the room R, carries a mobile telephone 5.

The tag reader 23 is provided at the MFP 1. The tag reader 23 emits radio waves of a prescribed frequency, receives the radio waves reflected by the IC tags T1 and T2 or the like, and reads the tag ID stored in the IC tags T1 and T2 or the like. The tag reader 23 is capable of reading tag IDs located within the room R. The tag reader 23 cannot read tag IDs of IC tags located outside of the room R.

The MFP 1 is connected to a Local Area Network (LAN) 4 via an interface (I/F) 15. The MFP 1 is connected to a telephone line P via a Network Control Unit (NCU) 16. The MFP 1 is also connected to the PCs 31 and 32 or the like and the Internet N via the LAN 4.

A unique telephone number is assigned to each of the MFP 1 and a remote FAX machine (not illustrated) connected to the telephone line P. The MFP 1 and the remote FAX machine operate in accordance with a procedure defined in the International Telecommunication Union-Telecommunications (ITU-T) recommendation T.30 to transmit or receive image data for facsimile communication (hereinafter referred to as "FAX image data") in accordance with a prescribed protocol.

A unique mail address is assigned to each of the MFP 1 and a remote I-FAX machine (not illustrated) connected to the Internet N. The MFP 1 and the remote I-FAX machine transmit or receive electronic mail for I-FAX communication (hereinafter referred to as "I-FAX mail") in accordance with a prescribed protocol (for example, the Simple Mail Transfer Protocol (SMTP) or the Post Office Protocol 3 (POP3)). The remote FAX machine and the remote I-FAX machine are installed in a room of a second company, a third company or the like.

The I-FAX mail includes image data for I-FAX communication (hereinafter referred to as "I-FAX image data"), and a header including a mail address of the I-FAX machine of the transmitter and information of a coding scheme or the like of the I-FAX image data. The header and the I-FAX image data are respectively text data.

The MFP 1 includes a CPU 10, a Read Only Memory (ROM) 11, a Random Access Memory (RAM) 12 and an Electrically Erasable and Programmable ROM (EEPROM) 13. The CPU 10 uses the RAM 12 as a work area. The CPU 10 controls each component of the MFP 1 in accordance with a control program and data stored in the ROM 11 and data stored in the EEPROM 13 to execute various processing. A part of a storage area of the EEPROM 13 is used as a processing mode storage unit 131 and a presence/absence storage unit 132. The processing mode storage unit 131 associates and stores the tag ID stored in the IC tags T1 and T2, or the like and a processing mode of various image data received in the FAX communication or the I-FAX communication. The presence/absence storage unit 132 stores information indicating whether or not each of the employees M1 and M2 or the like is present in the room R.

The CPU 10 stores electronic mail received via the I/F 15 or electronic mail to be transmitted via the I/F 15 in the RAM 12. The CPU 10 separates the I-FAX image data and the header from the received electronic mail, or generates electronic mail to be transmitted by including the I-FAX image data and the header. The CPU 10 inputs non-encoded image data (hereinafter referred to as "normal image data") or I-FAX image data to an electronic mail conversion unit 22, and converts between the normal image data and the I-FAX image data using a prescribed encoding scheme (for example, base 64 of the Multipurpose Internet Mail Extensions (MIME)).

An operation panel 14 of the MFP 1 includes a display unit 141 and an operation unit 142. The display unit 141 includes a Liquid Crystal Display (LCD). For example, the display unit 141 displays an operation status of the MFP 1, and an input instruction for the employees M1 and M2 or the like. The operation unit 142 includes various function keys including a start key, a ten-key numeric pad, a direction key for moving a cursor displayed on the display unit 141, and an OK key for the employees M1 and M2 or the like to operate the MFP 1 while looking at the display unit 141. Further, each key of the operation unit 142 may be a hardware key, or a software key provided on a touch screen arranged on the display unit 141.

A scanner unit 18 of the MFP 1 optically scans an original document set on the MFP 1 and generates the normal image data. The MFP 1 also includes an image memory 20, which includes a Dynamic RAM (DRAM) and stores the normal image data and/or the FAX image data. The MFP 1 includes a Coder and Decoder (CODEC) 19, which encodes the normal image data and decodes the FAX image data using a prescribed encoding scheme. The MFP 1 also includes the NCU 16 for controlling the telephone line P, and a modulator-demodulator (MODEM) 17 for transmitting and receiving the FAX image data to and from a FAX machine (not illustrated) via the telephone line P.

A printer unit 21 of the MFP 1 includes an electrophotographic printer engine, and a paper feed unit for feeding papers to a printer device. The printer unit 21 forms an image on printing paper in accordance with the normal image data stored in the image memory 20.

A voice generator 24 previously records a prescribed message, for example, "Facsimile has been received." The voice generator 24 is controlled by the CPU 10 and generates the recorded message.

Each of the PCs 31 and 32 or the like has a unique IP address and a unique mail address, and receives various image data transmitted from the MFP 1 via the LAN 4. The received image data is displayed on, for example, a display unit of the PCs 31 and 32 or the like, and is processed by image processing software of the PCs 31 and 32 or the like.

FIG. 3 illustrates an example of data stored in the processing mode storage unit 131. In the processing mode storage unit 131, identification information of the transmitter (in the drawing, "TRANSMITTER") and a tag ID stored in each of the IC tags T1 and T2 or the like (in the drawing, "TAG ID")

are associated and stored. A processing mode of various image data received when the employees M1 and M2 or the like are present in the room R (hereinafter referred to as a "presence processing mode", in the drawing, "PRESENCE"), and a processing mode of various image data received when the employees M1 and M2 or the like are absent (hereinafter referred to as an "absence processing mode", in the drawing, "ABSENCE"), are also stored by being associated with the identification information of the transmitter and the tag ID.

As the identification information of the transmitter, the processing mode storage unit 131 stores a telephone number of a FAX machine or a mail address of an I-FAX machine. For example, the processing mode storage unit 131 stores a telephone number of FAX machines installed in each of a second company and a third company (in the drawing, "TSI= . . . ") and a mail address of an I-FAX machine installed in a fourth company (in the drawing, "FROM= . . . "). The processing mode storage unit 131 stores information indicating a telephone number of a FAX machine and a mail address of an I-FAX machine installed in a company other than the second through the fourth companies ("OTHERS").

As the presence processing mode and the absence processing mode, the processing mode storage unit 131 stores information designating to transmit the normal image data to the PC 31 (or the PC 32) (including an Internet Protocol (IP) address of a transmission destination, in the drawing, "PC= . . .") and information designating to forward I-FAX mail to the PC 33 (including a mail address of a forwarding destination, in the drawing, "MAIL= . . . "). In the same manner, the processing mode storage unit 131 stores information designating to print out the normal image data (in the drawing, "PRINT OUT"), and information designating to notify the reception of various image data to the employee M4 having the mobile telephone 5 (including a telephone number of a notification destination, in the drawing, "TEL= . . . "). In addition, the processing mode storage unit 131 stores information designating to switch a destination to which various image data should be delivered from the employee M3 to the other employee M2 (including a tag ID of a switching destination, in the drawing, "TAG= . . . ").

The employee M1, who is a manager of the MFP 1, inputs the above data to the MFP 1 by operating the operation panel 14.

Further, the identification information of a plurality of transmitters may be associated with one tag ID. A plurality of tag IDs may be associated with the identification information of one transmitter. When receiving various image data from the transmitter, the image data may be delivered to all the employees M1 and M2 or the like relating to the associated tag ID or the employee M1 having a highest priority order among the employees M1 and M2 or the like relating to the associated tag ID. When the employee M1 having the highest priority order is absent, the image data is delivered to the employee M2 having a next highest priority order. When all the employees M1 and M2 or the like are absent, the image data is processed under the absence processing mode.

FIG. 4 illustrates an example of data stored in the presence/absence storage unit 132. The presence/absence storage unit 132 stores information indicating the presence or the absence of each of the employees M1 and M2 or the like (in the drawing, "PRESENCE/ABSENCE") by associating the information with the tag ID of the IC tags T1 and T2 or the like (in the drawing, "TAG ID"). For example, information indicating the presence, "○", is stored by being associated with a tag ID "0001". The information indicating the absence, "X", is stored by being associated with a tag ID "0004". In this case, the employee M1 with the tag ID "0001" (the employee M1 assigned with the IC tag T1 storing the tag ID "0001") is present in the room R, and the employee M4 with the tag ID "0004" is absent and has gone out by carrying the mobile telephone 5. The tag ID stored in the presence/absence storage unit 132 is the same tag ID as the tag ID stored in the processing mode storage unit 131.

The CPU 10 starts clocking an elapsed time with a timer (not illustrated) immediately after power is turned on. The CPU 10 stores information indicating the presence into the presence/absence storage unit 132 by associating the information with the tag ID read by the tag reader 23 during a prescribed elapsed time. Meanwhile, the CPU 10 repeatedly stores information indicating the absence into the presence/absence storage unit 132 by associating the information with the tag ID not read by the tag reader 23 within the prescribed elapsed time. That is, the CPU 10 always monitors the presence or the absence of each of the employees M1 and M2 or the like by using the tag reader 23, and periodically updates the information stored in the presence/absence storage unit 132. Therefore, the presence or the absence of each of the employees M1 and M2 or the like is not required to be set with the MFP 1, and a switching of the setting between presence and absence is not forgotten.

Further, the preferred embodiment of the present invention is not limited to the example in which the presence or the absence of the employees M1 and M2 or the like is monitored at all times. For example, when retrieving a tag ID from the processing mode storage unit 131 at step S14 of the presence/absence determination processing described hereinafter (FIG. 5), the tag ID corresponding to the retrieved tag ID may be attempted to be read by the tag reader 23.

Figure 5:
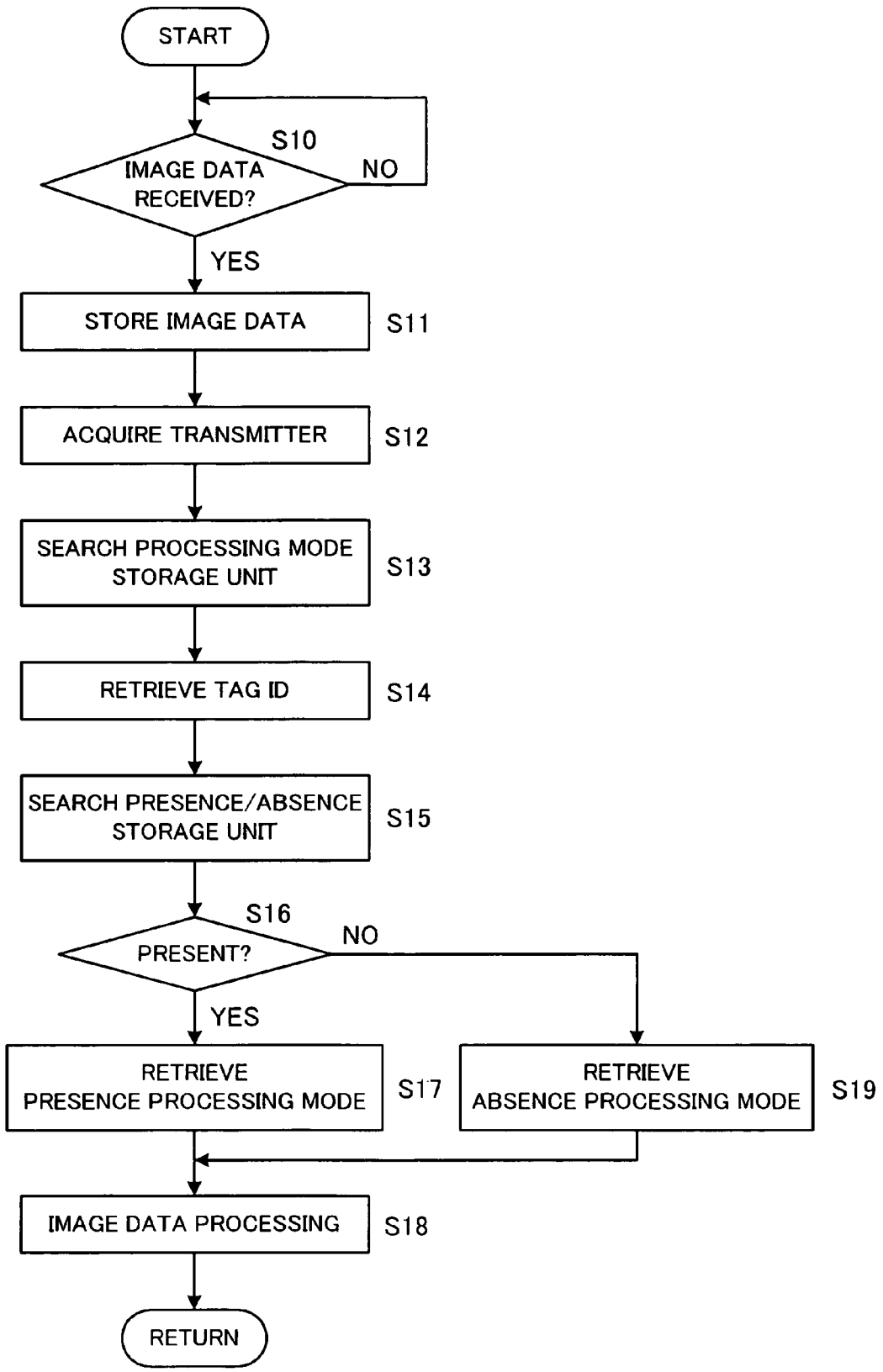
FIG. 5 is a flowchart illustrating a procedure of a presence/absence determination processing executed by a Central Processing Unit (CPU) of the MFP according to a preferred embodiment of the present invention.

FIG. 5 is a flowchart illustrating the procedure of the presence/absence determination processing executed by the CPU 10. The CPU 10 determines whether or not the FAX image data has been received by using the MODEM 17 and whether or not the I-FAX mail including the I-FAX image data has been received via the I/F 15 (step S10).

When receiving either one of the FAX image data and the I-FAX mail (step S10: YES), the CPU 10 stores the received image data (step S11). Specifically, when receiving the FAX image data at step S10, the CPU 10 inputs the FAX image data received by the MODEM 17 into the CODEC 19. The CODEC 19 decodes the input image data, and the CPU 10 stores the normal image data decoded by the CODEC 19 into the image memory 20. Meanwhile, when receiving the I-FAX mail including the I-FAX image data at step S10, the CPU 10 stores the received I-FAX mail in the RAM 12.

Next, the CPU 10 acquires the identification information of the transmitter of the image data received at step S10 (step S12). Specifically, when receiving the FAX image data at step S10, the CPU 10 acquires a telephone number of a FAX machine of a communication destination by using the MODEM 17. Meanwhile, when receiving the I-FAX mail at step S10, the CPU 10 acquires a mail address of an I-FAX machine written in a header of the received I-FAX mail.

The CPU 10 searches the processing mode storage unit 131 in accordance with the identification information of the transmitter acquired at step S12 (step S13). The CPU 10 retrieves the tag ID stored by being associated with the identification information of the transmitter acquired at step S12 (step S14). Next, the CPU 10 searches the presence/absence storage unit 132 in accordance with the tag ID retrieved at step S14 (step S15). Then, the CPU 10 determines whether or not the information indicating the presence is stored by being associated with the tag ID retrieved at step S14 (step S16).

When the information indicating the presence is stored in the presence/absence storage unit 132 by being associated with the tag ID retrieved at step S14 (step S16: YES), the CPU 10 refers to the processing mode storage unit 131 and retrieves the presence processing mode stored by being associated with the tag ID retrieved at step S14 (step S17). Then, the CPU 10 processes the image data stored at step S11 under the presence processing mode retrieved at step S17 (step S18). Meanwhile, when the information indicating the absence is stored in the presence/absence storage unit 132 by being associated with the tag ID retrieved at step S14 (Step S16: NO), the CPU 10 refers to the processing mode storage unit 131 and retrieves the absence processing mode stored by being associated with the tag ID retrieved at step S14 (step S19). Then, the process proceeds onto step S18, and the image data stored at step S11 is processed under the absence processing mode retrieved at step S19.

Specifically, when retrieving the information designating to transmit the normal image data to the PC 31 at step S17 or S19, the CPU 10 retrieves an IP address included in the retrieved information. Next, when the FAX image data has been received at step S10, the CPU 10 transmits at step S18 the normal image data stored in the image memory 20 at step S11 to the PC 31 having the retrieved IP address via the I/F 15 and the LAN 4. Then, the CPU 10 deletes the normal image data stored in the image memory 20.

Meanwhile, when the I-FAX mail has been received at step S10, at step S18, the CPU 10 separates the I-FAX image data from the I-FAX mail stored in the RAM 12 at step S11. The separated I-FAX image data is decoded by the electronic mail conversion unit 22, and the obtained normal image data is transmitted to the PC 31 having the IP address. Then, the CPU 10 deletes the I-FAX mail stored in the RAM 12 and the normal image data stored in the image memory 20.

When retrieving the information designating to forward the I-FAX mail to the PC 33 at step S17 or S19, the CPU 10 retrieves the mail address included in the retrieved information. Then, at step S18, the CPU 10 assigns the retrieved mail address as a destination to the header of the I-FAX mail stored in the RAM 12 at step S12, and transmits the I-FAX mail via the I/F 15 and the LAN 4. Then, the CPU 10 deletes the I-FAX mail stored in the RAM 12.

When retrieving the information designating to print out the normal image data at step S17 or S19, if the FAX image data has been received at step S10, at step S18, the CPU 10 inputs the normal image data stored in the image memory 20 at step S11 to the printer unit 21 and prints out the normal image data onto printing paper by the printer unit 21. Then, the CPU 10 deletes the normal image data stored in the image memory 20.

When retrieving the information designating to print out the normal image data at step S17 or S19, if the I-FAX mail has been received at step S10, at step S18, the CPU 10 separates the I-FAX image data from the I-FAX mail stored in the RAM 12 at step S11, decodes the separated I-FAX image data with the electronic mail conversion unit 22 and stores the obtained normal image data in the image memory 20. Next, the CPU 10 inputs the normal image data stored in the image memory 20 to the printer unit 21 and prints out the normal image data onto the printing paper by the printer unit 21. Then, the CPU 10 deletes the I-FAX mail stored in the RAM 12 and the normal image data stored in the image memory 20.

When retrieving the information designating to notify the reception of various image data to the employee M4 having the mobile telephone 5 at step S17 or S19, the CPU 10 retrieves the telephone number included in the retrieved information and makes a call to the mobile telephone 5 by using the NCU 16. The CPU 10 carries out voice communication by using the voice generator 24. Then, the CPU 10 saves the image data stored at step S11 without deleting the image data. The image data is saved until, for example, the employee M4 who has returned to the room R inputs a command into the MFP 1 for forwarding or printing out the image data by operating the operation panel 14, and the MFP 1 completes the forwarding or the printing out of the image data.

When retrieving the information designating to switch a destination to which various image data should be delivered from the employee M3 to the different employee M2 at step S17 or S19, the CPU 10 retrieves the tag ID included in the retrieved information and returns the process to step S15. Then, the CPU 10 saves the image data stored at step S11 without deleting the image data. The image data is saved until the forwarding or the printing out of the image data is completed at step S18.

After the process of step S18 has been completed, the CPU 10 returns the process to step S10. When both the FAX image data and the I-FAX mail have not been received (step S10: NO), the CPU 10 goes on a standby until receiving either the FAX image data or the I-FAX mail.

The processing mode storage unit 131 in the presence/absence determination processing includes a function for associating and storing the identification information stored in the storage medium (the IC tags T1, T2, etc.) for storing the identification information (tag ID) and the processing mode of the data (image data). The CPU 10 at steps S15 and S16 includes a function for determining whether or not the reader (the tag reader 23), which reads the identification information stored in the storage medium in a noncontact manner, has read the identification information stored in the processing mode storage unit 131. The CPU 10 at steps S17 and S18 includes a function for processing the received data under the mode stored in the processing mode storage unit 131 by being associated with the read identification information when a determination is made that the identification information stored in the processing mode storage unit 131 has been read.

The processing mode storage unit 131 includes a function for storing a plurality of different processing modes by associating with the identification information stored in the storage medium. When the CPU 10 at steps S19 and S18 determines that the identification information stored in the processing mode storage unit 131 has not been read, the CPU 10 processes the received data under a different processing mode stored in the processing mode storage unit 131 by being associated with the identification information.

The processing mode storage unit 131 includes a function for associating and storing the identification information stored in the storage medium and the transmitter of the receiving data. The CPU 10 at steps S15 and S16 includes a function for determining whether or not the identification information stored in the processing mode storage unit 131 by being associated with the transmitter of the received data has been read.

At step S18, the CPU 10 carries out a notification of a fact that the received data has been forwarded to the outside (the PCs 31, 32, . . . ), the received data has been printed out or the data has been received.

Suppose that FAX image data from the FAX machine (telephone number "12345") of the second company has been received by using the MFP 1. When the employee M1 relating to the second company (the employee M1 of the tag ID "0001") is present in the room R, the MFP 1 transmits the normal image data decoded from the FAX image data to the PC 31 of the employee M1 (IP address "192.168.1.1"). Therefore, the employee M1 receives the normal image data by its PC 31. Meanwhile, when the employee M1 is absent, the MFP 1 prints out the normal image data. Another employee present in the room R temporarily keeps the printed-out normal image data. When the employee M1 returns to the room R, the employee M1 receives the printed-out normal image data from the other employee.

Suppose that I-FAX mail is received from the I-FAX machine of the fourth company (mail address "abc@fax.net"). When the employee M3 relating to the fourth company (the employee M3 with a tag ID "0003") is present in the room R, the MFP 1 forwards the received I-FAX mail to the PC 33 of the employee M3 (mail address "0003@pc.com"). Therefore, the employee M3 receives the I-FAX image data included in the I-FAX mail by the PC 33 of the employee M3 (or the normal image data decoded from the I-FAX image data by the PC 33). Meanwhile, when the employee M3 is absent, the MFP 1 delivers the normal image data decoded from the I-FAX image data to the employee M2 with the tag ID "0002" or prints out the normal image data.

When the employee M4 relating to a company other than the second through the fourth companies (the employee M4 with the tag ID "0004") is present, the FAX image data and the I-FAX image data included in the I-FAX mail transmitted from the company other than the second through the fourth companies are respectively decoded and printed out and delivered to the employee M4. When the employee M4 is absent, the MFP 1 makes a call to the mobile telephone 5 (telephone number "090-1234-5678") carried by the employee M4 to notify the reception of the image data to the employee M4 by voice.

Further, in the above-described preferred embodiment, the MFP 1 includes the tag reader 23. However, the MFP 1 may communicate with a tag reader connected to the LAN 4 and receive a tag ID read by the tag reader. In this case, a tag ID reading area can be widened, and an installation location of the MFP 1 in the room R is not be limited.

The processing mode of the image data is not limited to the above-described processing. For example, the decoded normal image data may be printed out by a printer device connected to the LAN 4 or may be forwarded to a file server. When notifying the reception of the image data to the absent employee M4, instead of the voice communication, electronic mail including a document notifying the reception may be transmitted to the mobile telephone 5. Instead of distributing the image data to the PCs 31 and 32 or the like of the present employees M1 and M2 or the like, electronic mail including a message notifying the reception of the image data may be transmitted to the PCs 31 and 32 or the like.

Instead of storing different identification information in the IC tags T1 and T2 or the like, same identification information may be stored in a part of a plurality of the IC tags. In this case, when at least one person is present among the plurality of the employees assigned with the IC tags, the data may be processed by the presence processing mode, and when all the employees assigned with the IC tags are absent, the data may be processed by the absence processing mode.

While the description above refers to particular embodiments of the present invention, it will be understood that many modifications may be made without departing from the scope thereof. The accompanying claims are intended to cover such modifications as would fall within the true scope and sprit of the present invention.

The reference to particular embodiments is therefore to be considered in all respects as illustrative and not restrictive, the scope of the invention being indicated by the appended claims, rather than the foregoing description, and all changes will come within the meaning and range of equivalency of the claims are therefore intended to be embraced therein.

What is claimed is:

1. A communication device, which receives data from a transmitting device outside, the communication device comprising:
    means for storing identification information;
    means for storing a data processing mode by associating with the identification information;
    means for reading the identification information in a noncontact manner;
    means for determining whether or not the identification information stored by being associated with the data processing mode has been read;
    means for processing the received data in accordance with the data processing mode associated with the identification information when the means for determining determines that the identification information has been read;
    means for determining that the identification information stored by being associated with the a different data processing mode has not been read;
    means for processing the received data under the different data processing mode stored by being associated with the identification information not read;
    means for storing transmitter information of the received data by associating with the identification information;
    means for determining that the identification information stored by being associated with the transmitter information has been read; and
    means for notifying that the data has been received as one processing mode.

2. The communication device according to claim 1, further comprising means for forwarding the received data to the outside as one processing mode.

3. The communication device according to claim 1, further comprising means for printing the received data as one processing mode.

4. The communication device according to claim 1, further comprising means for generating voice indicating that the data has been received.

5. A communication device, which receives data from a transmitting device outside, the communication device comprising:
    a receiving unit which receives the data;
    a storage medium which stores identification information;
    a first memory which stores a data processing mode by associating with the identification information;
    a reader which reads the identification information from the storage medium in a noncontact manner;
    a processor connected to the first memory and the reader, wherein when the processor determines that the reader has read the identification information stored in the storage medium, the processor retrieves the processing mode stored in the first memory by being associated with the read identification information and processes the received data, wherein
    the first memory stores a plurality of data processing modes by associating with the identification information, and when the reader fails to read the identification information, the processor processes the data by a different processing mode stored in the first memory by being associated with the identification information, and
    the communication device further comprises a second memory that stores a transmitter of the data by associating with the identification information, wherein the processor refers to the second memory and determines whether or not the identification information associated with the transmitter of the received data has been read by the reader; and a display that notifies that the data has been received as one processing mode.

6. The communication device according to claim 5, further comprising a forwarding unit which forwards the received data to a client terminal via a network as one processing mode.

7. The communication device according to claim 5, further comprising a printer which prints out the received data as one processing mode.

8. The communication device according to claim 5, further comprising a communication unit which notifies that the data has been received as one processing mode.

9. A communication method for receiving data from a transmitting device outside, the communication method comprising the steps of:

reading identification information from a storage medium in a noncontact manner;

determining whether or not the identification information has been read;

retrieving a processing mode stored by being associated with the identification information when the identification information has been read;

executing a processing of the received data under the retrieved processing mode;

extracting transmitter information from the received data;

retrieving an associated processing mode in accordance with the extracted transmitter information and information as to whether or not the identification information has been read;

retrieving a different processing mode stored by being associated with the identification information that failed to be read when the identification information fails to be read and processing the received data under the different retrieved processing mode; and notifying that the data has been received as one processing mode.

10. The communication method according to claim 9, further comprising the step of forwarding the received data as one processing mode.

11. The communication method according to claim 9, further comprising the step of printing out the received data as one processing mode.

12. The communication method according to claim 11, further comprising the step of converting the received data into image data.

13. The communication method according to claim 9, further comprising the step of notifying a reception of the data by voice through telephone communication.

* * * * *